United States Patent [19]

Frommelt

[11] Patent Number: 4,718,207
[45] Date of Patent: Jan. 12, 1988

[54] LOADING DOCK SHELTERS

[75] Inventor: Robert J. Frommelt, Peosta, Iowa

[73] Assignee: Frommelt Industries, Inc., Dubuque, Iowa

[21] Appl. No.: 887,750

[22] Filed: Jul. 18, 1986

Related U.S. Application Data

[63] Continuation-in-part of Ser. No. 606,339, May 2, 1984, Pat. No. 4,601,142.

[51] Int. Cl.⁴ .............................................. E04N 14/00
[52] U.S. Cl. ................................................ 52/173 DS
[58] Field of Search ............ 52/173 DS; 49/485, 498, 49/496

[56] References Cited

U.S. PATENT DOCUMENTS

| | | | |
|---|---|---|---|
| 4,038,792 | 8/1977 | McGuire et al. | 52/173 DS |
| 4,213,279 | 7/1980 | Layne | 52/173 DS |
| 4,365,452 | 12/1982 | Fillman et al. | 52/173 DS |
| 4,601,142 | 7/1986 | Frommelt | 52/173 DS |

Primary Examiner—William F. Pate, III
Assistant Examiner—Richard E. Chilcot, Jr.
Attorney, Agent, or Firm—Emrich & Dithmar

[57] ABSTRACT

A loading dock shelter of the pad type having L-shaped configuration, which, in normal operation provides a wrap-around type of engagement with the rear end of trucks backed into operative engagement with the loading dock shelter.

14 Claims, 17 Drawing Figures

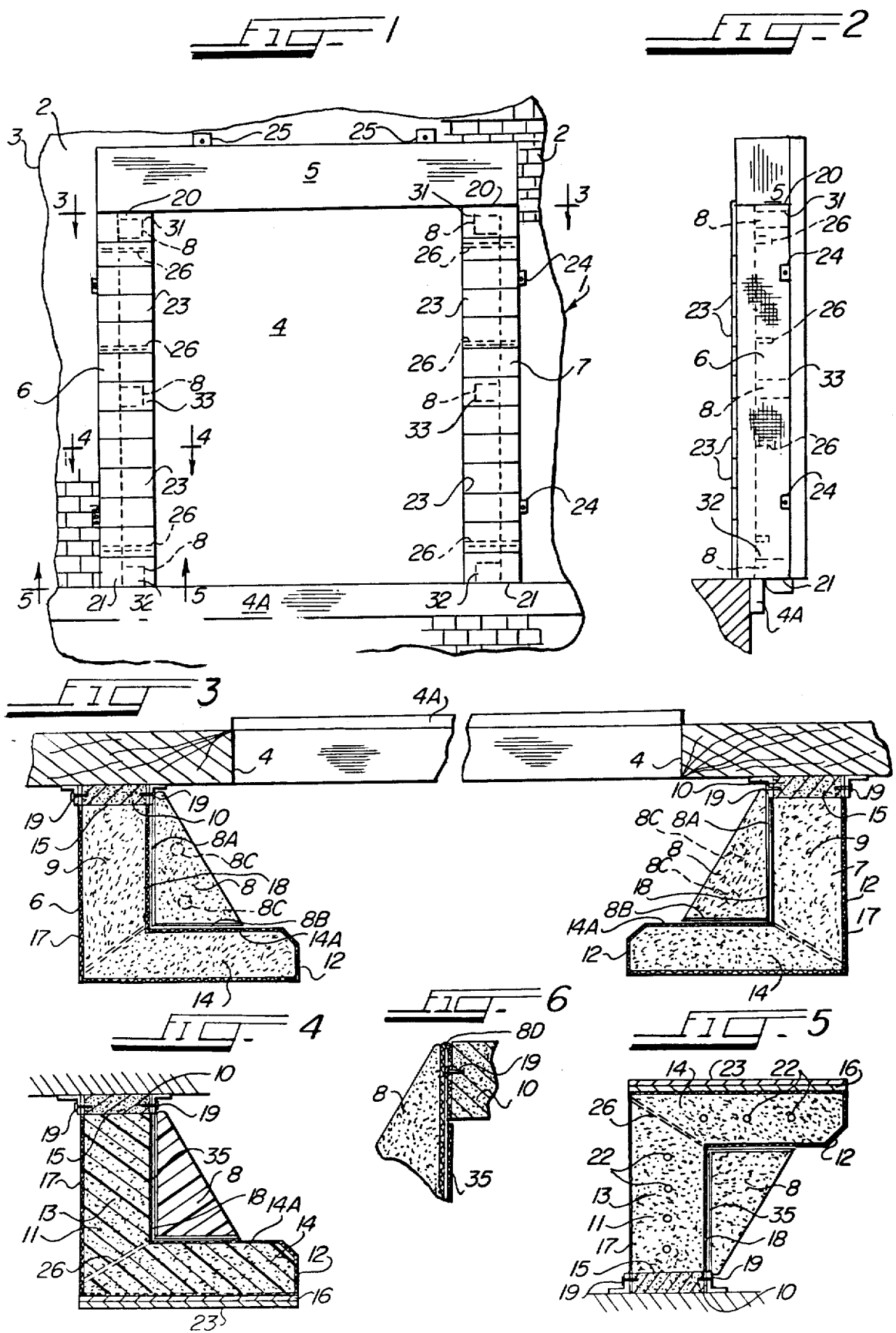

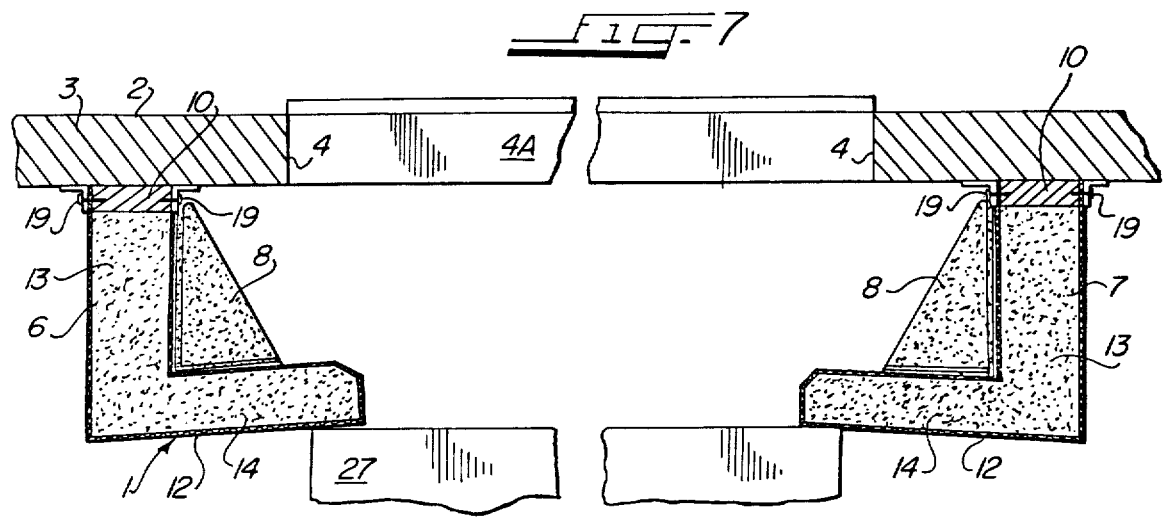
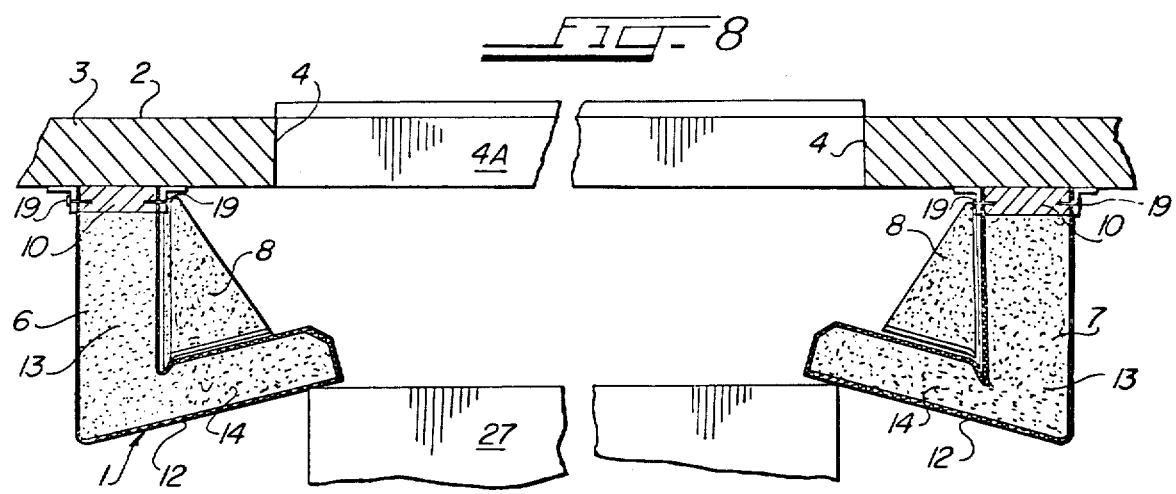
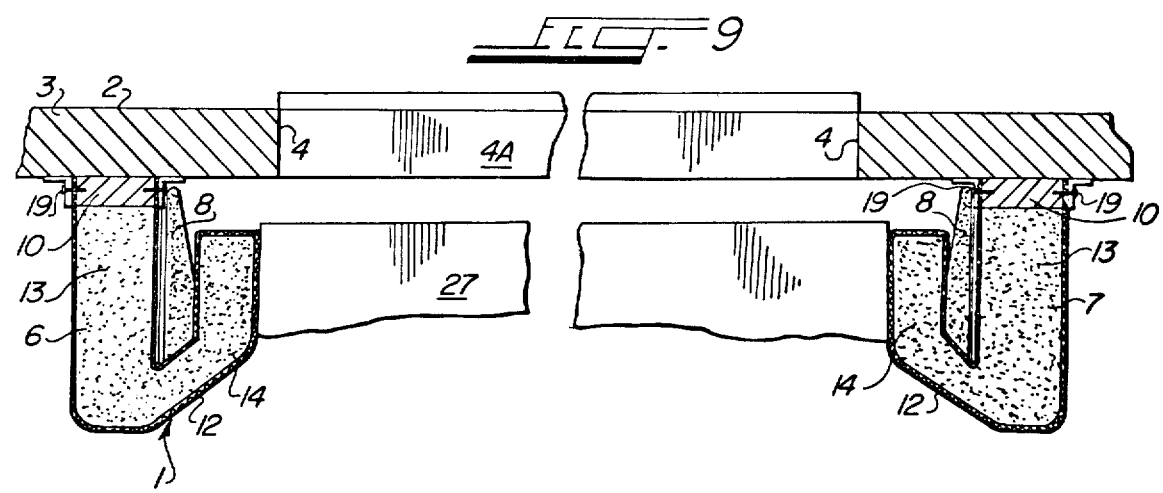

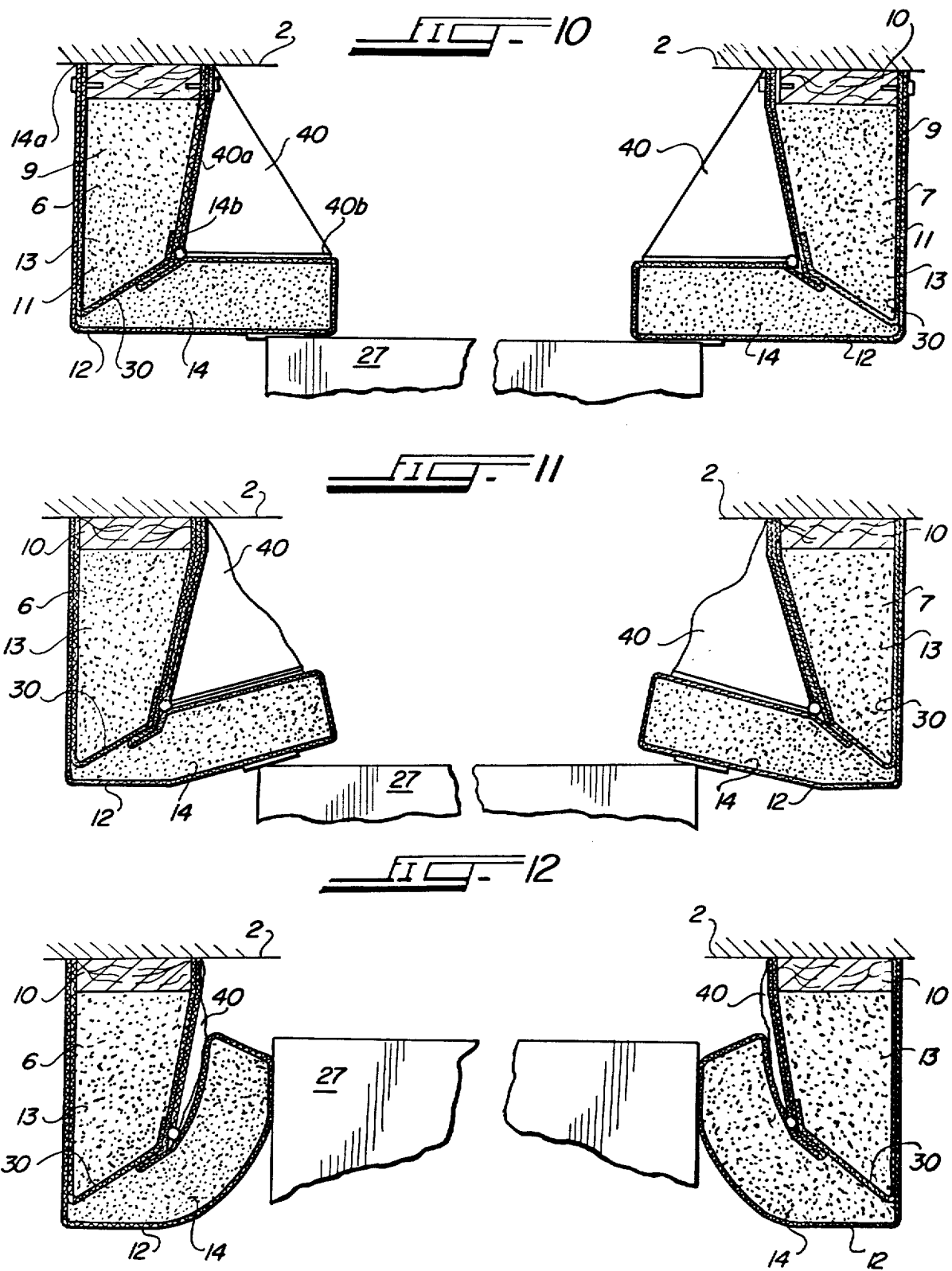

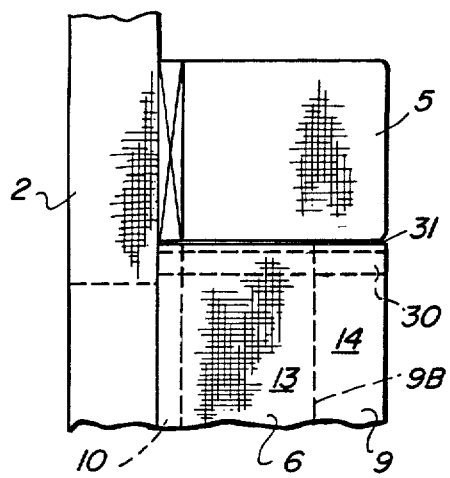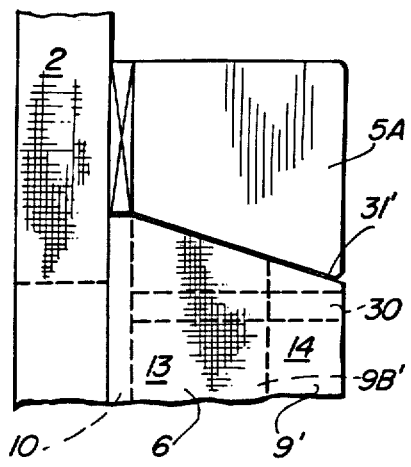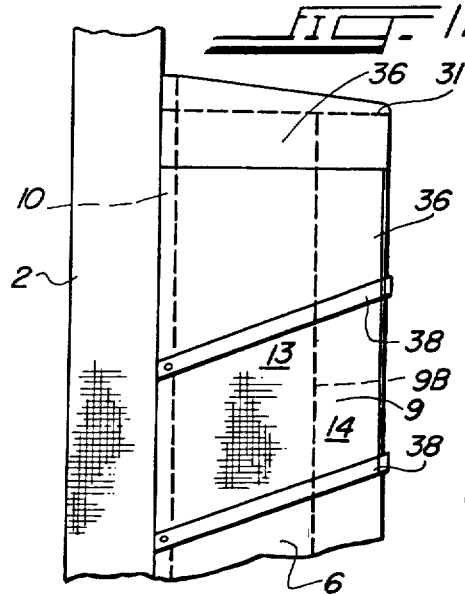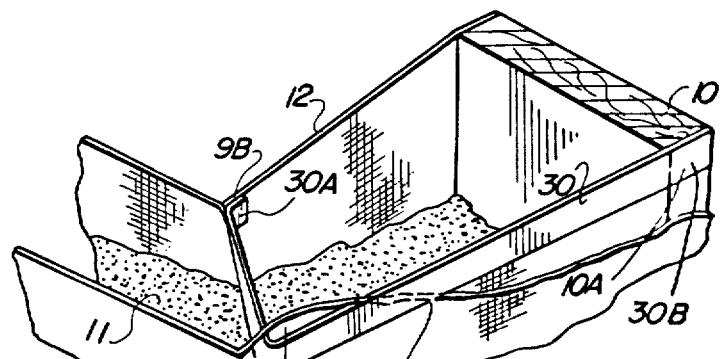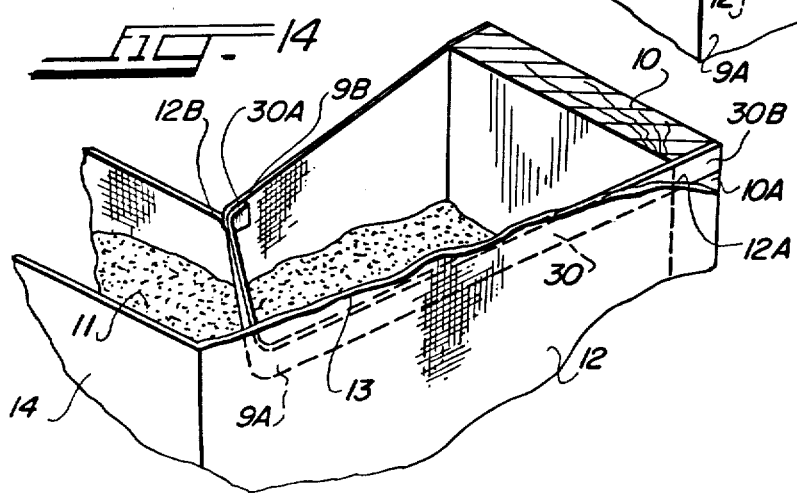

LOADING DOCK SHELTERS

RELATED APPLICATION

This application is a continuation-in-part application of pending U.S. patent application Ser. No. 606,339, filed 5-2-84 now U.S. Pat. No. 4,601,142, filed in the name of Robert J. Frommelt and assigned to assignee of the present application.

BACKGROUND OF THE INVENTION

The present invention relates to loading dock shelters and, more particularly, to loading dock shelters of the pad type.

It is a primary object of the present invention to provide a novel loading dock shelter.

Loading dock shelters of the pad type have been heretofore known in the art, being shown, for example, in U.S. Pat. No. 3,181,205 issued May 4, 1965 to C. P. Frommelt and S. J. Frommelt and U.S. Pat. No. 3,500,599, issued Mar. 17, 1970, to S. Sciolino. However, such pad type structures have been unable to accomodate trucks of various width while at the same time providing good sealing engagement. Also, loading dock shelters of the curtain type or "drape type" have been heretofore known in the art being shown, for example, in U.S. Pat. Nos. 3,638,667 and Re 28,391, issued Feb. 1, 1972 and Apr. 15, 1975, respectively, to C. P. Frommelt and S. J. Frommelt. In addition, loading dock shelters of the pneumatic type have also heretofore been known in the art, being shown, for example, in U.S. Pat. Nos. 3,391,503, issued July 9, 1968 to Larry O'Neal and 3,939,614, issued Feb. 24, 1976 to C. P. Frommelt and S. J. Frommelt.

Finally, the dock seal for loading dock shelters having an L pad configuration havetofore been known in the art, being shown, for example, in U.S. Pat. No. 4,213,279, issued July 22, 1980 to Richard Z. Lane. However, such an L-shaped dock seal is comprised of two distinct flange strips that are mounted together to engage the sides of the truck, and seals of this structure readily loose their L-pad shape during usage and fail to provide good sealing engagement with the sides of the truck upon prolonged usage.

It is an important object of the present invention to afford a novel loading dock shelter of the pad type, which affords improvements over loading dock shelters heretofore known in the art, including loading dock shelters of the aforementioned pad type, "drape type", and pneumatic type.

Another object of the present invention is to provide a novel loading dock shelter of the pad type which is highly effective in affording good sealing engagement with trucks of substantial variations in widths.

A further object of the present invention is to afford a novel loading dock shelter of the pad type which is capable of providing, in a unique and expeditious manner, a "wrap-around" type of engagement with trucks of "normal" widths (as distinguished from "over-size" widths) backed into operative engagement therewith.

An object ancillary to the foregoing objects is to provide a novel loading dock shelter of the aforementioned type which, in operation, affords effective and efficient sealing engagement even with trucks of "over-size" widths backed into operative engagement therewith.

Still another object of the present invention is to provide a novel loading dock shelter of the pad type having L-shaped pads wherein the body portion and the lateral extending leg portion are integral to and filled with a foam material throughout to provide a loading dock shelter which permits efficient sealing engagement with the ends and sides of the truck backed into operative engagement therewith.

Another object of the present invention is to afford a novel loading dock shelter of the pad type which is practical and efficient in operation and which may be readily and economically produced commercially.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front elevational view of a loading dock shelter of the pad type embodying the principles of the present invention;

FIG. 2 is a side elevational view of the loading dock shelter shown in FIG. 1;

FIG. 3 is a sectional view taken substantially along the line 3—3 in FIG. 1;

FIG. 4 is a detail sectional view taken substantially along the line 4—4 in FIG. 1;

FIG. 5 is a bottom plan view of a portion of the loading dock shelter shown in FIG. 1, looking in the direction of the arrows 5—5 in FIG. 1;

FIG. 6 is an enlarged plan view of the mounting of the stablizing wedges of the loading dock shelter in accordance with the present invention;

FIG. 7 is a view similar to FIG. 4, with a truck being shown diagrammatically in initial engaging position with the loading dock shelter in accordance with the present invention;

FIGS. 8 and 9 are views similar to FIG. 7 with the truck being shown in progressively further operative engagement with the loading dock shelter in accordance with the present invention;

FIG. 10 is a view similar to FIG. 4, with a truck being shown diagrammatically in an initial engaging position with a loading dock shelter in accordance with a further embodiment of the present invention;

FIGS. 11 and 12 are views similar to FIG. 10 with the truck being shown in progressively further operative engagement with the loading dock shelter in accordance with the embodiment shown in FIG. 10;

FIG. 13 is a perspective of the L-shaped pad of the embodiment shown in FIG. 10 showing the cover tensioning strap extended diagonally across the body at the junction between the body portion and the leg portion of the pad unit being attached to the outside cover of the pad unit in accordance with the present invention;

FIG. 14 is a perspective view of the pad unit showing a cover tensioning strap extending diagonally across the junction between the body portion and the leg portion of the pad unit and mounted to the inside surface of the cover member for in accordance with the present invention;

FIG. 15 is a partial end view of the pad unit in accordance with the invention of FIG. 10 being mounted to a square head pad in accordance with the present invention;

FIG. 16 is a partial end view showing the mounting of the L-shaped pad in accordance with the embodiment of FIG. 10 mounted to a bevelled head pad; and FIG. 17 is a partial end view showing the mounting of the L-shaped pad in accordance with the embodiment of FIG. 10 with a head type curtain in accordance with the present invention.

DESCRIPTION OF THE EMBODIMENTS SHOWN HEREIN

A loading dock shelter 1, embodying the principles of the present invention, is shown in the drawings and illustrates one preferred embodiment of the present invention. It is shown mounted on an outer wall 2, of a warehouse 3 in surrounding relation to a doorway 4 in the warehouse 3, FIG. 1.

The loading dock shelter 1 embodies, in general, a head pad 5 and two oppositely disposed side pads 6 and 7. In operation, the shelter 1 is mounted on the warehouse 3 in such a position that the head pad 5 is disposed above and extends along the doorway 4, and the side pads 6 and 7 are disposed laterally outwardly of, and extend along respective vertical sides of the doorway 4. An elongated bumper 4A is mounted on the warehouse wall 2 below the doorway 4 and the lower ends of the side pads 6 and 7, the bumper 4A projecting outwardly from the warehouse wall 2 and extending along the lower edge of the doorway 4, FIG. 1.

The side pads 6 and 7 are identical in construction, each embodying a pad unit 9 and, in the preferred embodiment of the present invention, a backing member or backing plate 10 on which the pad unit 9 is mounted, as shown in FIG. 3. The backing members 10 may be made of any suitable material, such as, for example, wood or steel, or the like, but, preferably, are made from a suitable wooden material, such as, for example, wood planking.

Each of the pad units 9 is substantially L-shaped in transverse cross-section, and includes a core 11 and a cover member 12, FIG. 4, which extend the full length of the backing member 10. The core 11 may be made of any suitable material, such as, for example, any suitable natural or synthetic compressible, resilient resin or polymer, the preferred material being a foamed polyester. Similarly, the cover or casing 12 may be made of any suitable material, but preferably is made of a flexible, water-repellent, wear resistant material, such as, for example, canvas duck or rubber impregnated nylon fabric.

Both of the pad units 9 are substantially L-shaped in transverse cross-section, each embodying a body portion 13 and a leg portion 14 disposed substantially perpendicularly to each other in the normal, at-rest position of the respective pad unit 9, as shown in FIG. 3. Also, it is preferred that the foam material utilized in the construction of the body portion 13 of the pad unit 9 possess a greater density than the foam material utilized in the construction of the leg portion 14 of the pad unit 9 or for the stabilizing wedges 8, for reasons that will hereinafter be described.

Also, it is found that foamed stabilizing wedges 8 are positioned adjacent the L-shaped pad units 9 to provide a stabilizing structure between the body portion 13 and the leg portion 14 of the pad units. Preferably, when the pad unit 9 exceeds approximately 8 feet in height or greater, the wedges 8 are positioned at the top 31 of the pad unit and at the bottom 32 of the pad unit 9 and intermediate the top and bottom at 33, as shown in dotted lines in FIG. 1. However, when the pad unit 9 is less than 8 feet in height, wedges need only be placed at the top and bottom of the pad unit to provide structural stability of the unit after repeated usage. The foamed wedges 8 are preferably mounted to the side walls 18 and 14A of the cover 12 on the pad unit 9 by utilizing a ready attachment means 35 on the edges 8A and 8B, such as a touch and hook type fastener and the like, and include breather vents 8C on the bottom thereof, as shown in dotted lines in FIG. 3. The stabilizing wedges 8 provide structural support for the pad units 9 and return the pad units to their L-shaped configuration after repeated usage of the pad unit 9, as will hereinafter be described in FIGS. 7-9. As shown in FIG. 6, the stabilizing wedges 8 are mounted to the side edges of the respective backing members 10 by a suitable means, such as, nails or screws 19 through a wedge strap 8D.

In each of the side pads 6 and 7, the face of the core 11 of the body portion 13 remote from the leg portion 14 preferably is secured by suitable adhesive, not shown, to one face 15 of the respective backing member 10, in substantially flat juxtaposition thereto.

Each of the covers 12 includes a front wall 16 and two side walls 17 and 18, FIG. 4, with the side wall 17 extending substantially directly rearwardly from one side edge of the front wall 16, and the other side wall 18 extending rearwardly from the other side edge of the front wall 16 in a substantially reverse, laterally disposed Z-shape, FIG. 3. The covers 12 are disposed around the respective cores 11 in snug fitting relation thereto, and the longitudinal edge portions of the side walls 17 and 18 thereof, remote from the respective front walls 16, are secured to the longitudinal side edges of the respective backing members 10 by a suitable means, such as, nails or screws 19. Each of the covers 12 includes also end walls 20 and 21, FIG. 1, closing the top and bottom thereof, respectively. As shown in FIGS. 4 and 5, the wedges are positioned and attached to the cover 12 on leg portion 14 and to the sidewall 18 of the cover adjacent to the end walls 20 and 21. Preferably, the bottom wall 21 has vents 22 therethrough, FIG. 5.

In the preferred form of the loading dock shelter 1, the front wall 16 of the cover 12 of the side pads 6 and 7 thereof includes a plurality of overlapping, flexible, wear-resistant flaps or plates 23, as shown in FIG. 1, stitched or otherwise suitably secured to the underlying fabric of the cover 12 to provide protection against abrasion and tearing of the pad unit 9, in the manner disclosed in greater detail in the aforementioned U.S. Pat. No. 3,181,205. The flaps or plate 23 are attached only at their upper edges to the underlying fabric of the cover 12, and, therefore, each flap or plate 23 is free to move up and down individually of the other flaps, and, because they are flexible, and their sides and bottoms are unattached, they can flex or fold enough to move up and down with an abutting part of the rear of a truck backed into operative engagement with the loading dock shelter 1 to thereby protect the side pads 6 and 7 from wear and tearing.

The side pads 6 and 7 may be mounted in operative position on a warehouse wall, or the like, such as, for example, the wall 2, by any suitable means, but, preferably, are secured thereto by the use of angle brackets 24, having one leg secured to the wall 2 and the other leg thereof secured to a side edge of the respective backing member 10, as shown in FIG. 1.

In the assembled position of the loading dock shelter 1, the side pads 6 and 7 are secured to the wall 2 on respective opposite, lateral sides of the doorway 4, FIG. 3, with the body portions 13 thereof projecting substantially perpendicularly from the wall 2, and with the legs 14 thereof projecting inwardly toward each other from the side portions of the body portions 13 remote from the backing member 10. The head pad 5 preferably is disposed on top of the side pads 6 and 7 and is secured to the warehouse wall 2 by suitable means such as angle brackets 25, a position as shown in FIG. 1. The head pad 5 is substantially rectangular in cross-section and, preferably, projects outwardly from the warehouse wall 2 the same distance as the side pads 6 and 7, FIG. 2.

In the preferred form of the loading dock shelter 1, ties 26, FIGS. 1, 2, 4, which may be made of any suitable material, such as, for example, narrow strips of canvas duck, or the like, extend diagonally across the internal junction between the high density foam material in the body portions 13 and the lower density foam material in the leg portions 14 of the pad units 9, and are secured to the inner face of the respective side walls 17 and 18 to afford reinforcing members for aiding in retaining the rectangular cross-sectional shapes of the body portions 13.

It will be seen that, with this construction, when the loading dock shelter 1 is mounted in operative position on a warehouse wall, or the like such as, for example, the wall 2, the side pads 6 and 7, in their normal, at-rest position, are substantially L-shaped in transverse cross section with the body portions 13 projecting substantially perpendicularly outwardly from the wall 2, and with the leg portions 14 extending inwardly toward each other in substantially uniplanar relation to each other and retained in such a position by the stabilizing wedges 8.

Preferably, the side pads 6 and 7 are so spaced from each other that when a truck of "normal" size, such as the truck 27 shown in FIGS. 7-9, is backed into operative engagement therewith, the sides of the rear of the truck overlap the leg portions 14 a distance greater than the distance between the inner ends of the leg portions 14, and less than the distance between the inner sides of the body portions 13, as shown in FIG. 7. It will be seen that, with this construction, even the initial engagement of the loading dock shelter 1 with the truck 27 affords excellent sealing engagement therebetween. However, as the truck 27 continues to move rearwardly toward the warehouse wall 2, it is effective to cause the leg portions 14, containing the less dense foam material, to bend or flex inwardly around their junctures with the body portions 13, as shown in FIGS. 8 and 9, until, at the innermost position of the truck 27, the leg portions 14 are compressed between the sides of the truck 27 and the body portions 13 of the loading dock pads 6 and 7 with the wedges 8 compressed therebetween, FIG. 9, to afford an effective "wrap-around" type of sealing engagement between the side pads 6 and 7 of the loading dock shelter 1 and the truck 27, with the side pads 6 and 7 disposed completely out of any position in which they would afford an obstruction to ingress or egress into and out of the truck 27 through the doorway 4. After the truck 27 is removed from loading dock shelter 1, the wedges 8 return the leg portions 14 to their substantially uniplanar relation with respect to each other and the body portions 13 to their substantially perpendicular extension from the wall.

A further embodiment of the present invention is shown in FIGS. 10-17. In this embodiment, the side pads 6 and 7 are substantially L-shaped in transverse cross-section with each embodying a body portion 13 and a leg portion 14 disposed substantially perpendicular to each other in the normal, at rest position of the respective pad unit, as shown in FIG. 10. The body portion 13 and leg portion 14 are filled with a core 11 which may be made of any suitable material, such as, for example, natural or synthetic compressible, resilient resin or polymer, the preferred material being a foam polyester. The core 11 is enclosed within the cover member 12 which may be made of any suitable material but preferably is made of a flexible, water-repellent, wear resistant material, such as, for example, canvas duck, or rubber impregnated nylon fabric. The core 11 and its cover 12 preferably extend the full length of the backing member 10 to which the pad unit is mounted, as shown in FIG. 10 and which extend around the doorway for as shown in FIG. 1. In each of the pad units 9, the body portion 13 thereof is, preferably, tapered inwardly from its attachment edge 14a towards its forward outward extending position at edge 14b. The leg portion 14 is disposed substantially perpendicularly to the body portion 13 in the normal at rest position as shown in FIG. 10. The core or foam material 11 which is utilized in construction of the body portion 13 and leg portion 14 has a uniform density throughout the core, sufficient to provide structural integrity for the L-shaped pad unit 9.

As shown in FIGS. 13 and 14 a cover tensioning strap or means 30 is provided to be positioned within the L-pad structure to extend diagonally across the internal junction between the body portion 13 and the leg portion 14 to engage the cover 12 adjacent the forward corner 9A of the pad unit 9. As is shown in FIGS. 10-12 and 14, in the preferred embodiment, the cover tensioning strap 30 extends along the inside surface 12A of the cover 12 with one end 30A extending diagonally towards the leading corner 9A of the pad unit 9 and stitched or otherwise secured to the inside surface of the cover 12 at 12B and the other end 30B located for lateral attachment to the backing plate 10 at 10A.

As shown in FIG. 13, the cover tensioning strap or means 30 may be attached to the cover 12 at the junction between the body portion 13 and the leg portion 14 at corner 9B and extend diagonally outwardly to and through an opening 12c in the cover 12 at the forward corner 9A of the pad unit and extend laterally backwardly to mount to the backing plate 10 at 10A. By positioning the cover tensioning strap or means 30 at the top and bottom of the pad unit 9 and periodically spacing cover tensioning strap or means every two or three feet along the length thereof, depending upon the length of the pad unit, it has been found that it is unnecessary with such a construction to require the side pads 6 and 7, or for the body portions 13 and leg portion 14 thereof to contain a core material 11 having different densities. Thus, the core material 11 for the embodiment shown in FIGS. 10-17 may be of a single density and merely sufficient to provide structural integrity to the side pads 6 and 7 respectively.

Additionally, the use of the cover tensioning strap means 30 eliminates the need for utilizing wedges 8 at the top and bottom of the L-pad structure to aid and assist in the structural integrity of the L-pad unit as described for the embodiment shown in FIGS. 1-9.

As shown in FIGS. 10-12, each of the side pads 6 and 7 further includes a bottom seal 40 in the form of a triangular-shaped piece of canvas or the like. The bottom seal 40 is located at the bottom of the side pads 6 and 7 with upturned edges 40a, 40b, attached to the bottom edge of the cover 12. Bottom seals 40 prevent upward air flow along the back or inner side-surface of the side members 6 and 7 from the bottom of the side pads 6 and 7. Such upward air flow could cause distortion of the L-pads in use.

FIG. 15 is a partial end view of the mounting of the L-pad side pad 6 or 7 of the pad unit 9 onto a header 5 in accordance with the embodiment of the present invention as illustrated in FIGS. 10-14. As shown in FIG. 15, the header 5 may be mounted to the top 31 of the pad unit 9 by the use of any conventional fastening means such as a touch and hook type fastener and the like. As shown in FIG. 15, tne cover tensioning strap 30 is mounted adjacent the top edge of the side pad unit 9 and extends rearwardly for attachment to the backing plate 10.

As shown in FIG. 16, a pad unit 9' in accordance with the embodiment as illustrated in FIGS. 10-14 is mounted to a bevelled head pad 5A. In such a construction, the top 31' of the side pad 6' has an upper surface of a diagonal construction which is adapted to mainly fit and engage with the head pad 5A by suitable fastening means such as a touch and hook type fastener and the like.

FIG. 17 illustrates the mounting of the pad unit 9 and the side pad with a head curtain 36 which is mounted above the top 31 of the side pad 6 and is drapped over and down the leading forward edge of the leg portion 14 of the pad unit 9. In such a construction, head pad tensioning straps 38 extend diagonally rearwardly to engage the backing plate 10 for maintaining the head curtain and pad unit 9 in fixed and operating condition.

As shown in FIGS. 10-12, the side pads 6 and 7 are spaced from each other when a truck 27 is backed into operative engagement therewith, the sides of the rear of the truck overlap the leg portions 14 a distance greater than the distance between the inner ends of the leg portions 14, and less than the distance between the inner sides of the body portions 13 as shown in FIG. 10. It will be seen that with this construction the initial engagement of the loading dock shelter with the truck 27 affords excellent sealing engagement therebetween. However, as the truck continues to move rearwardly towards the warehouse wall 2 it is effective to cause the leg portion 14, to bend or flex inwardly around their junctures with the body portions 13 as shown in FIGS. 11 and 12 until at the inner most position of the truck 27, the leg portions 14 are compressed between the sides of the truck 27 and the body portion 13 of the loading dock pads 6 and 7, with the bottom seals 40 compressed therebetween at the bottom edges of the side pads 6 and 7. This provides an effective "wrap-around" type of sealing engagement between the side pad 6 and 7 of the loading dock shelter 1 and the truck 27, with the side pad 6 and 7 disposed completely out of any position in which they would afford an obstruction to ingress or egress into and out of the truck 27 through the doorway 4. Also, bottom seals 40 prevent upward air flow along the rear or inner surface of the side pads 6 and 7. After the truck 27 is removed from the loading dock shelter 1, the leg portions 14 return to their substantially perpendicular relationship with respect to body portions 14 to the position as shown in FIG. 10.

It has been found that by positioning the cover tensioning strap or means 30 at the top and bottom of the leg of the side pads 6 or 7, respectively, and intermediate the length thereof at approximately two to three foot intervals, the pad unit structure which provides highly efficient sealing engagement with the trucks and which practical and efficient in operation which is durable in construction is provided.

However, in addition to affording a nonobstructing highly efficient sealing engagement between the loading dock shelter 1 and the truck 27, it will be seen that the present invention also affords a novel loading dock shelter which is effective with a large variety of truck widths, the shelter 1 affording good sealing engagement with trucks which little more than span the distance between the adjacent faces of the leg portions 14 and trucks of such width that the side walls thereof abuttingly engage the side pads 6 and 7 in alignment with the body portions 13 thereof, in a manner such as that in which trucks compressingly engage pads of the type shown in the aforementioned U.S. Pat. No. 3,557,508.

From the foregoing it will be seen that the present invention affords a novel loading dock shelter which provides effective sealing engagement with trucks moved into operative engagement with the loading dock shelter.

In addition, it will be seen that the present invention affords a novel loading dock shelter which is effective to afford good sealing engagement with trucks of a wide variety of widths.

Also, it will be seen that the present invention affords a novel loading dock shelter wherein, when it is disposed in sealing engagement with trucks of the desired width, highly efficient sealing engagement is effected with such trucks in a manner which affords no obstruction to the passage of people or materials into and out of the rear of the truck.

In addition, it will be seen that the present invention affords a novel loading dock shelter of the pad type wherein, when it is disposed in sealing engagement with trucks of the desired width, highly effective "wrap-around" type of sealing engagement is afforded between the truck and the side pads of the shelter.

Moreover, it will be seen that the present invention provides a novel loading dock shelter of the pad type which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A loading dock shelter for attachment to a wall having a doorway therein, comprising:
    a head pad for extending along the top of a doorway in the wall,
    two side pads for extending along the respective lateral sides of the doorway, each of said side pads comprised of a resilient core of compressible, resilient material and having a cover member therearound, said cover member including an inner side panel and an outer side panel, support means for supporting said head pad and said side pads on the wall in outwardly projecting relation thereto, and each of said side pads comprising an elongated body portion having upper and lower ends, said body portion adapted to extend substantially vertically on the wall adjacent to the doorway therein, and an elongated leg portion projecting laterally from a portion of said body portion spaced outwardly from the wall in position to extend inwardly across a portion of the doorway and extending longitudinally along said body portion substantially throughout the length of the latter, and a plurality of cover tensioning means for each of said side pads positioned substantially along the length thereof and each having a first portion extending along said outer side panel and secured to said support means rearwardly of said side pads, and a second portion extending diagonally across the junction of said body and leg portions and secured to said inner side panel of said cover member.

2. A loading dock shelter as defined in claim 1, which includes cover tensioning means positioned at least at the top and bottom of each of said side pads.

3. A loading dock shelter as defined in claim 2, wherein said plurality of cover tensioning means are straps.

4. A loading dock shelter as defined in claim 1, wherein said cover member includes at least one opening therein to permit at least one of said cover tensioning means to extend downwardly from the junction of said body and leg portions through said at least one opening for rearwardly attachment to said means for supporting said side pads on such a wall.

5. A loading dock shelter as defined in claim 1, and in which each of said side pads is substantially L-shaped in transverse cross-section.

6. A loading dock shelter as defined in claim 1, wherein each of said side pads comprises a bottom seal member attached to said cover member near the lower edge thereof defining a generally horizontally extending barrier at the rearward surface of said side pad.

7. A loading dock shelter as defined in claim 1, and in which each of said side pads includes a plurality of flaps of wear-resilient, flexible material attached to said cover member on the side of said body portion thereof remote from such a warehouse wall, and the side of said leg portion thereof remote from such a warehouse wall, said flaps being arranged in overlapping relation to each other longitudinally of said side pad, and being secured to said cover member only along their respective upper edge portions.

8. A loading dock shelter for attachment to a wall having a doorway therein, comprising:

a head pad for extending along the top of a doorway in the wall, two side pads for extending along the respective lateral sides of the doorway, each of said side pads comprised of a resilient core of compressible, resilient material and having a cover member therearound, said cover member including an inner side panel and an outer side panel, support means for supporting said head pad and said side pads on the wall in outwardly projecting relation thereto in position to be operatively engaged by the top and sides of the rear of a truck backed into loading or unloading position relative to the doorway in the wall, and each of said side pads comprising a generally L-shaped core with an elongated body portion having upper and lower ends, said body portion adapted to extend substantially vertically on the wall along one of the lateral sides of the doorway, and an elongated leg portion extending laterally from said body portion along the length of said body portion in position to be disposed outwardly from the doorway with said body portion and said leg portion defining an internal junction therebetween, and projecting inwardly toward the other of said side pads across a portion of said doorway, and a plurality of cover tensioning means for each of said side pads positioned substantially along the length thereof and each having a first portion extending along said outer side panel with a first end secured to said support means rearwardly of said side pad, and a second portion extending diagonally across said internal junction with a second end secured to said inner side panel of said cover member to urge said leg portion toward a position opposing the other of said side pads across a portion of the doorway.

9. A loading dock shelter as defined in claim 8, which includes cover tensioning means positioned at least at the top and bottom of each of said side pads.

10. A loading dock shelter as defined in claim 9, wherein said plurality of cover tensioning means are straps.

11. A loading dock shelter as defined in claim 8, and in which said leg portion of each of said side pads projects from the portion of said body portion of said pad which is substantially the most remote portion thereof from such a warehouse wall when said side pad is disposed in operative position on said wall.

12. A loading dock shelter as defined in claim 8, and in which said leg portion of each of said side pads is substantially straight in the normal at-rest position thereof and is bent over onto said body portion when in the engaged position with the sides of the rear of a truck.

13. A loading dock shelter as defined in claim 8, wherein each of said side pads comprises bottom seal means including a generally triangular member positioned near the bottom of said side pad and having first and second edges secured to said cover member along the extent of the body portion and leg portion of the pad defining a barrier for preventing updrafts rearwardly of the side pads.

14. A loading dock shelter as defined in claim 11, and in which each of said side pads includes a plurality of flaps of wear-resistant, flexible material attached to said cover member thereof on the sides of said body portion and said leg portion thereof remote from such a wall when said side pad is disposed in normal at-rest position, said flaps being disposed in overlapping relation to each other in a row extending longitudinally of said side pad with th upper of adjacent flaps being disposed in overlying relation to the lower of said adjacent flaps, and being secured to said cover member on said pad only along their respective upper edge portions.

* * * * *

UNITED STATES PATENT AND TRADEMARK OFFICE
CERTIFICATE OF CORRECTION

PATENT NO. : 4,718,207
DATED : January 12, 1988
INVENTOR(S) : Robert J. Frommelt It is certified that error appears in the above—identified patent and that said Letters Patent is hereby corrected as shown below:

Column 1, line 42, change "loose" to ---lose---;
Column 7, line 23, change "tne" to ---the---;
  and
Column 10, line 63, change "th" to ---the---.

Signed and Sealed this

Seventh Day of June, 1988

*Attest:*

DONALD J. QUIGG

*Attesting Officer*  *Commissioner of Patents and Trademarks*